US012808460B2

(12) United States Patent
Yang et al.

(10) Patent No.: US 12,808,460 B2
(45) Date of Patent: Nov. 24, 2026

(54) CABLE BUFFERING DEVICE AND CABLE SUPPLY SYSTEM

(71) Applicants: TE Connectivity Solutions GmbH, Schaffhausen (CN); Tyco Electronics (Shanghai) Co., Ltd., Shanghai (CN)

(72) Inventors: An (Joshua) Yang, Shanghai (CN); Lvhai (Samuel) Hu, Shanghai (CN); Roberto Francisco-Yi Lu, Middletown, PA (US)

(73) Assignees: TE Connectivity Solutions GmbH, Schaffhausen (CH); Tyco Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 19/214,270

(22) Filed: May 21, 2025

(65) Prior Publication Data

US 2025/0361953 A1 Nov. 27, 2025

(30) Foreign Application Priority Data

May 21, 2024 (CN) ........................ 202421120411.X

(51) Int. Cl.
*F16L 3/01* (2006.01)
*B65H 51/04* (2006.01)

(52) U.S. Cl.
CPC ............. *F16L 3/012* (2013.01); *B65H 51/04* (2013.01); *B65H 2513/10* (2013.01)

(58) Field of Classification Search
CPC ..... F16L 3/012; B65H 51/04; B65H 2513/10; B21F 23/00
See application file for complete search history.

(56) References Cited

U.S. PATENT DOCUMENTS

| | | | | | |
|---|---|---|---|---|---|
| 4,186,861 | A * | 2/1980 | Steinhilber | B65H 51/20 | 242/364.2 |
| 5,366,131 | A * | 11/1994 | Hoffa | B65H 51/20 | 226/118.3 |
| 10,696,513 | B2 * | 6/2020 | Johnson | B65H 63/02 | |
| 12,068,568 | B2 * | 8/2024 | Weber | B21F 23/00 | |
| 12,365,562 | B2 * | 7/2025 | Yang | B65H 57/14 | |

* cited by examiner

*Primary Examiner* — Anita M King
(74) *Attorney, Agent, or Firm* — Barley Snyder

(57) ABSTRACT

A cable buffering device includes a bracket, a slide rail, a slider, an upper wheel, a lower wheel, and a driver. The slide rail is fixed on the bracket and extends in a vertical direction. The slider is slidably installed on the slide rail and moves along the slide rail. The upper wheel is rotatably mounted on the slider and rotates around a first horizontal axis. The lower wheel is located below the upper wheel and rotatably mounted on the bracket. The lower wheel rotates around a second horizontal axis parallel to the first horizontal axis. The driver is installed on the bracket and connected to the slider. The driver drives the slider and the upper wheel to move along the slide rail and adjusts a buffer amount of a cable wound on the upper wheel and the lower wheel. The driver applies a predetermined tension to the cable wound on the upper wheel and the lower wheel by driving the upper wheel to move along the slide rail.

17 Claims, 5 Drawing Sheets

CABLE BUFFERING DEVICE AND CABLE SUPPLY SYSTEM

CROSS-REFERENCE TO RELATED APPLICATION

This application claims the benefit of the filing date under 35 U.S.C. § 119(a)-(d) of Chinese Patent Application No. CN202421120411.X filed on May 21, 2024.

FIELD OF THE INVENTION

The present invention relates to a cable buffering device and, more particularly, to a cable buffering device and a cable supply system comprising the cable buffering device.

BACKGROUND OF THE INVENTION

In the prior art, there is often inconsistency between a cable supply speed and a cable usage speed; consequently, a cable buffering device must be installed in the cable supply system. When the cable supply speed is greater than the cable usage speed (e.g., when the cable usage equipment is paused), the supplied cable can be temporarily buffered in the cable buffering device. When the cable usage speed exceeds the cable supply speed, the cable buffering device can temporarily supply the cable. This ensures the continuous operation of the entire production line. However, typical cable buffering devices have problems such as complex structures, large volumes, and are difficult to control.

SUMMARY OF THE INVENTION

A cable buffering device includes a bracket, a slide rail, a slider, an upper wheel, a lower wheel, and a driver. The slide rail is fixed on the bracket and extends in a vertical direction. The slider is slidably installed on the slide rail and moves along the slide rail. The upper wheel is rotatably mounted on the slider and rotates around a first horizontal axis. The lower wheel is located below the upper wheel and rotatably mounted on the bracket. The lower wheel rotates around a second horizontal axis parallel to the first horizontal axis. The driver is installed on the bracket and connected to the slider. The driver drives the slider and the upper wheel to move along the slide rail and adjusts a buffer amount of a cable wound on the upper wheel and the lower wheel. The driver applies a predetermined tension to the cable wound on the upper wheel and the lower wheel by driving the upper wheel to move along the slide rail.

BRIEF DESCRIPTION OF DRAWINGS

The invention will now be described by way of example with reference to the accompanying figures, of which.

DETAILED DESCRIPTION

Figure 1:
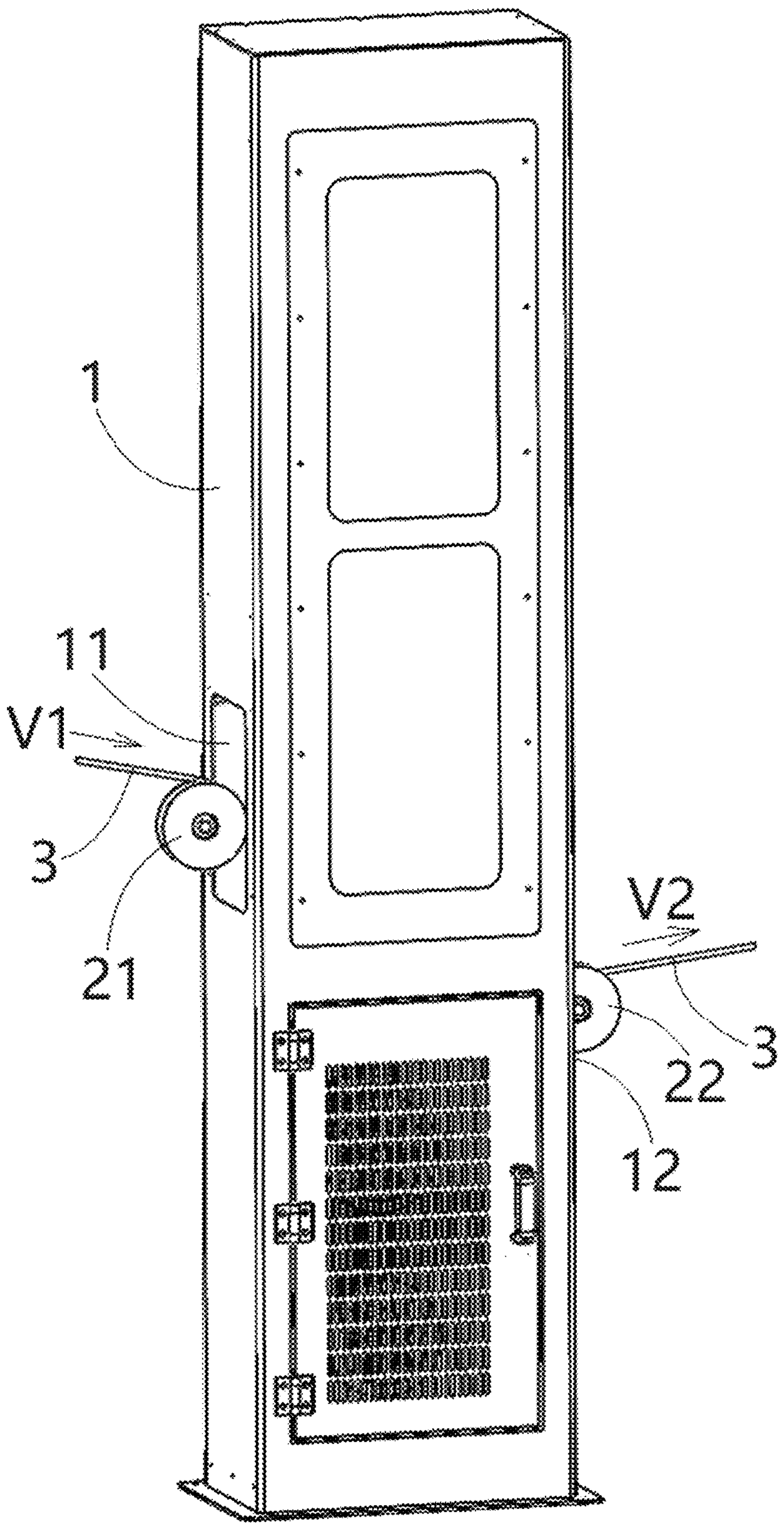
FIG. 1 is a perspective view of a cable buffering device according to an exemplary embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 2:
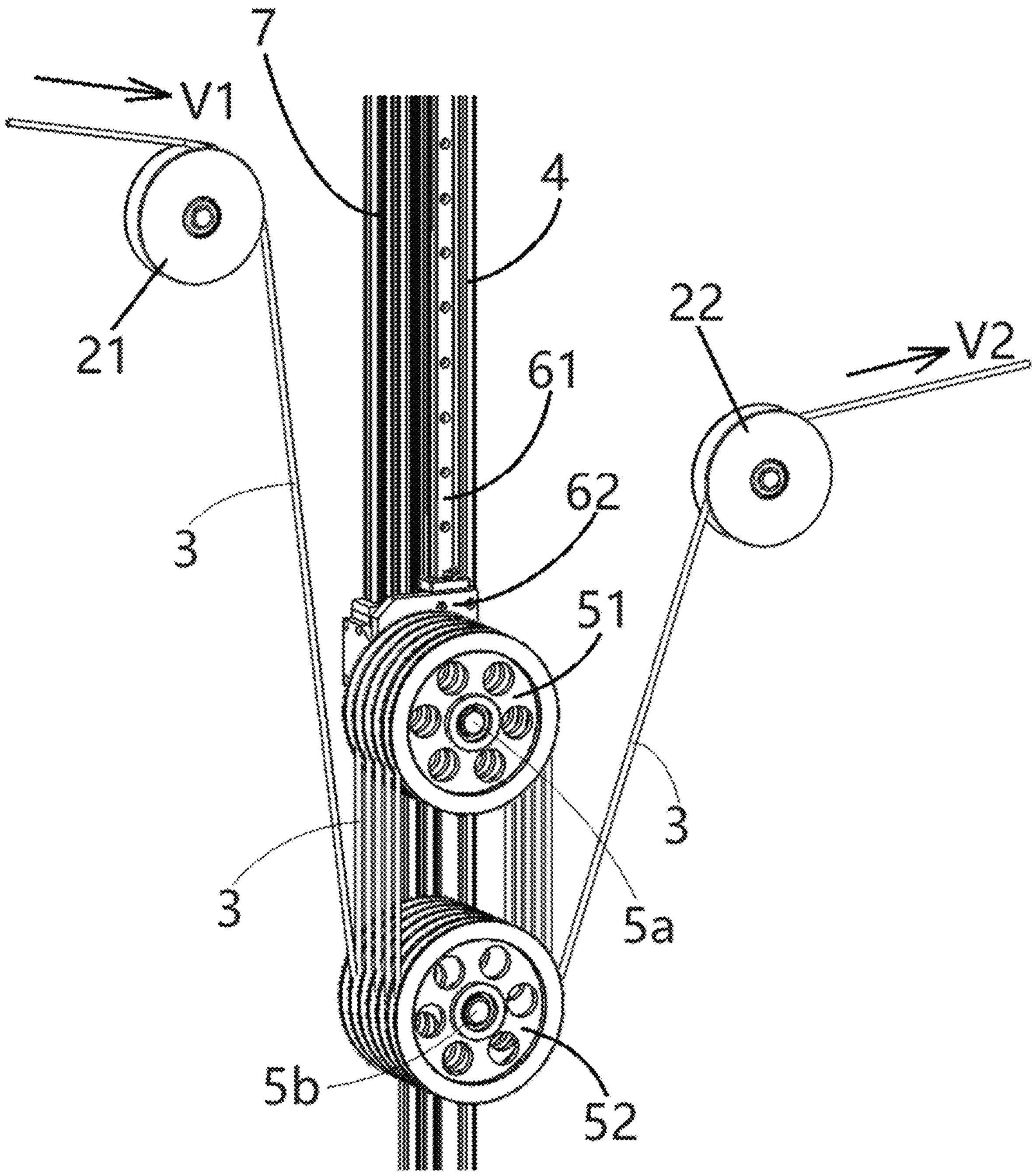
FIG. 2 is an enlarged view of an upper wheel, a lower wheel, an input guide wheel, and an output guide wheel of the cable buffering device of FIG. 1.
Figure 3:
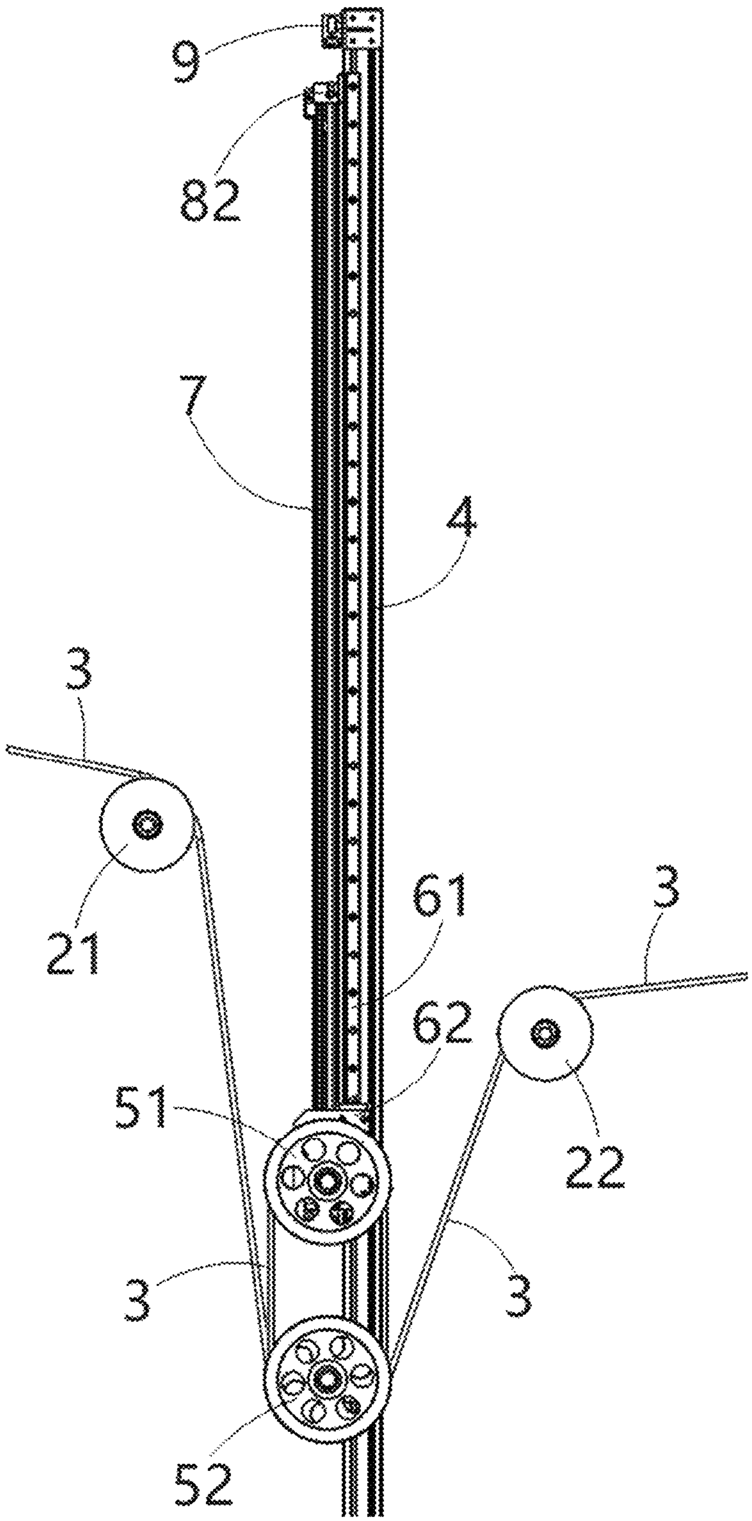
FIG. 3 is a perspective view of the cable buffering device of FIG. 1 with a housing of the cable buffering device not shown.

An exemplary embodiment of a cable buffering device is now described with reference to FIGS. 1-5. As shown in FIGS. 2-3, the cable buffering device comprises a bracket 4, a slide rail 61, a slider 62, an upper wheel 51, a lower wheel 52, and a driver 7. The slide rail 61 is fixed on the bracket 4 and extends vertically. The slider 62 is installed on the slide rail 61 in a sliding manner and can be moved along the slide rail 61. The upper wheel 51 is rotatably mounted on the slider 62 and can be rotated around a first horizontal axis. The lower wheel 52 is located below the upper wheel 51 and is rotatably mounted on the bracket 4. The lower wheel 52 is capable of being rotated around a second horizontal axis parallel to the first horizontal axis. The driver 7 is installed on the bracket 4 and connected to the slider 62. The driver 7 is used to drive the slider 62 and the upper wheel 51 to move along the slide rail 61. The driver 7 adjusts the buffer amount of a cable 3 wound around the upper wheel 51 and the lower wheel 52. The driver 7 applies a predetermined tension to the cable 3 wound around the upper wheel 51 and the lower wheel 52 by driving the upper wheel 51 to move along the slide rail 61.

As shown in FIG. 2, an upper wheel shaft **5*a* is fixed on the slider 62. The upper wheel 51 is rotatably mounted on the upper wheel shaft 5*a*, so that the upper wheel 51 can be rotated about the first horizontal axis relative to the bracket 4 and can be moved in the vertical direction relative to the bracket 4. As further shown in FIG. 2, a lower wheel shaft 5*b* is fixed on the bracket 4. The lower wheel 52 is rotatably installed on the lower wheel shaft 5*b*, so that the lower wheel 52 can be rotated relative to the bracket 4 about the second horizontal axis but cannot be moved in the vertical direction relative to the bracket 4**.

Figure 4:
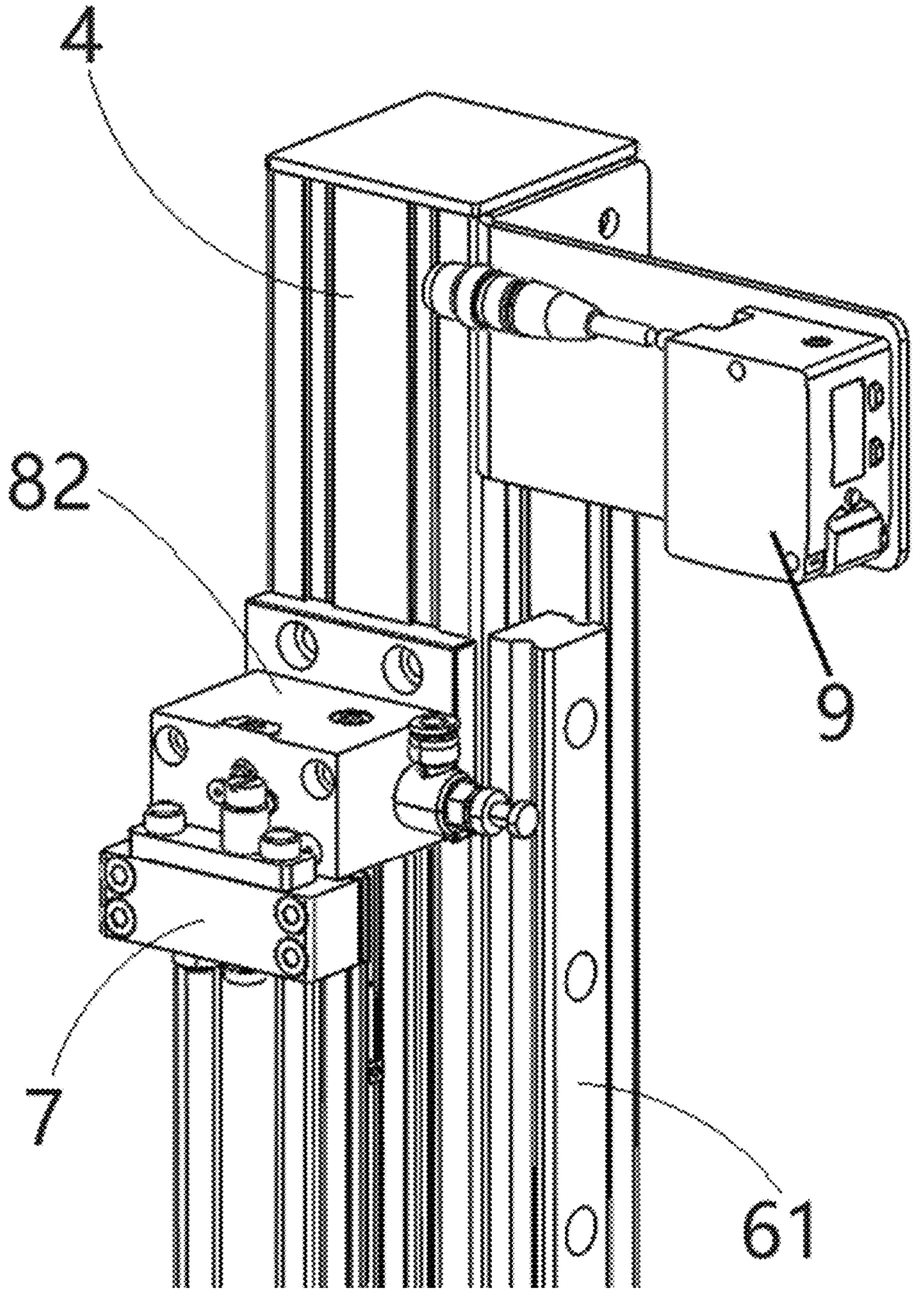
FIG. 4 is an enlarged view of the cable buffering device of FIG. 1, in which a height sensor is shown.
Figure 5:
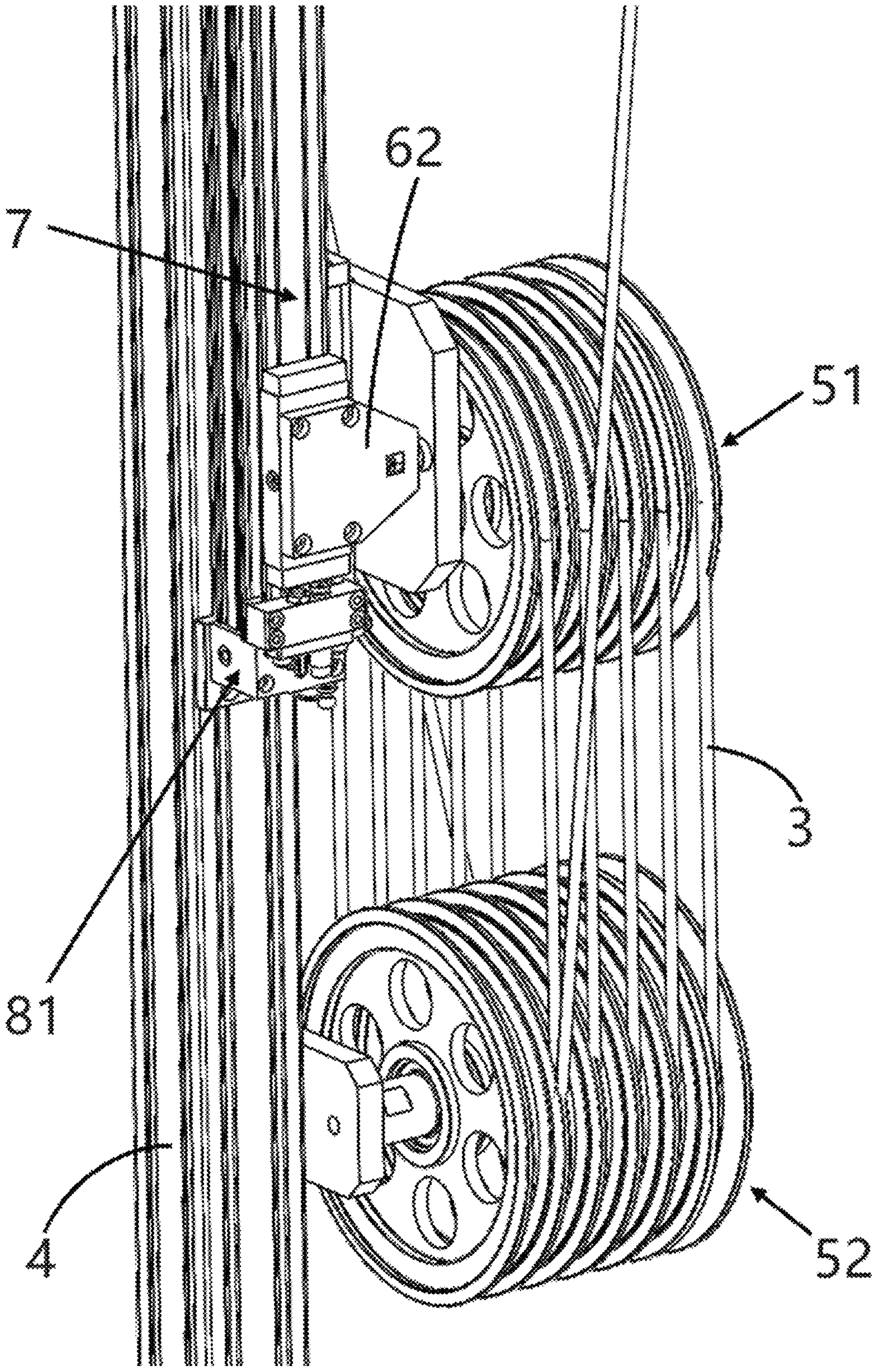
FIG. 5 is an enlarged view of the upper wheel of FIG. 2 and the lower wheel of FIG. 2.

As shown in FIGS. 4-5, the driver 7 includes an electrical control cylinder mounted on the bracket 4, and the actuator of the electrical control cylinder is connected to the slider 62. The actuator of the electrical control cylinder drives the slider 62 and the upper wheel 51 to move in the vertical direction.

As shown in FIG. 4, the cable buffering device further includes a lower limit block 82. The lower limit block 82 is fixed on the bracket 4 to limit the lower limit position of the upper wheel 51. When the upper wheel 51 is moved to the lower limit position, the lower limit block 82 rests against the slider 62 to restrict the upper wheel 51 at the lower limit position.

As shown in FIGS. 3 and 5, the lower limit block 82 is located above and adjacent to the lower wheel 52. During the online maintenance of the cable buffering device, the upper wheel 51 is moved to the lower limit position under its own gravity and is supported at the lower limit position by the lower limit block 82. In this way, during maintenance, the upper wheel 51 is parked on the lower limit block 82, allowing maintenance personnel to simultaneously access both the upper wheel 51 and the lower wheel 52.

As shown in FIG. 5, the cable buffering device further includes an upper limit block 81. The upper limit block 81 is fixed on the bracket 4 to limit the upper limit position of the upper wheel 51. When the upper wheel 51 is moved to the upper limit position, the upper limit block 81 rests against the slider 62 to restrict the upper wheel 51 at the upper limit position.

As shown in FIG. 1, the cable buffering device further comprises a housing 1. The bracket 4, the upper wheel 51, and the lower wheel 52 are accommodated in the housing 1. A cable input port 11 that allows the cable 3 to input into the housing 1 and a cable output port 12 that allows the cable 3 to output from the housing 1 are formed in the housing 1.

As shown in FIGS. 1-3, the cable buffering device further comprises an input guide wheel 21 and an output guide wheel 22. As shown in FIG. 1, the input guide wheel 21 is rotatably installed at the cable input port 11 of the housing 1. The input guide wheel 21 is used to guide the input of the cable 3 into the cable buffering device. As shown in FIG. 1, the output guide wheel 22 is rotatably installed at the cable output port 12 of the housing 1. The output guide wheel 22 is used to guide the cable 3 to output from the cable buffering device.

As shown in FIGS. 1-3, the input guide wheel 21 is higher than the output guide wheel 22. As shown in FIGS. 2-3, the output guide wheel 22 is higher than the lower wheel 52. The cable 3 is guided to the lower wheel 52 via the input guide wheel 21 and wound around the lower wheel 52 and the upper wheel 51. The cable 3 is guided from the lower wheel 52 to the outside of the cable output port 12 via the output guide wheel 22.

The cable buffering device further includes an input speed sensor, an output speed sensor, and an upper wheel height controller. The input speed sensor is installed on the input guide wheel 21 to detect the input speed V1 of the cable 3 input into the cable buffering device. The output speed sensor is installed on the output guide wheel 22 to detect the output speed V2 of the cable 3 from the cable buffering device. The upper wheel height controller adjusts the height of the upper wheel 51 in real time based on the difference between the input speed V1 of the cable 3 and the output speed V2 of the cable 3, so that the height of the upper wheel 51 matches the difference between the input speed V1 of the cable 3 and the output speed V2 of the cable 3.

When the input speed V1 of the cable 3 is greater than the output speed V2 of the cable 3, the upper wheel height controller controls the driver 7 to drive the upper wheel 51 to move upward, in order to increase the height of the upper wheel 51 and the buffer amount of the cable 3 in the cable buffering device. When the input speed V1 of the cable 3 is less than the output speed V2 of the cable 3, the upper wheel height controller controls the driver 7 to drive the upper wheel 51 to move downward, in order to reduce the height of the upper wheel 51 and the buffer amount of the cable 3 in the cable buffering device.

The cable buffering device further includes an upper wheel height sensor 9 and an upper wheel height calculator. As shown in FIG. 3, the upper wheel height sensor 9 is installed on the top of the bracket 4 and faces the upper wheel 51. The upper wheel height sensor 9 is used to detect the actual height of the upper wheel 51. The upper wheel height calculator is used to calculate the ideal height of the upper wheel 51 based on the difference between the input speed V1 of the cable 3 and the output speed V2 of the cable 3. The upper wheel height controller adjusts the height of the upper wheel 51 in real-time based on the difference between the actual height of the upper wheel 51 and an ideal height of the upper wheel 51, until the actual height of the upper wheel 51 equals the ideal height.

As shown in FIG. 1, the cross-section of the housing 1 is rectangular and tower shaped, and the height of the housing 1 in the vertical direction is greater than a length of the housing 1 and a width of the housing 1 in the horizontal direction. As shown in FIGS. 2-5, the cross-section of the bracket 4 is rectangular and cylindrical, and the height of the bracket 4 in the vertical direction is greater than a length of the bracket 4 and a width of the bracket 4 in the horizontal direction.

An exemplary embodiment of a cable supply system is now described with reference to FIGS. 1-5. The cable supply system includes a cable supply device and the cable buffering device according to FIGS. 1-5. The cable supply device is used to supply the cable 3. The cable buffering device is suitable for buffering the cable 3 supplied from the cable supply device.

As shown in FIGS. 1-5, the illustrated cable buffering device has the following advantages: (1) high space utilization: the tower design occupies the smallest area and is suitable for various production environments, especially factories with limited space; (2) large storage capacity: the cable buffering device has a large capacity, effectively alleviating the accumulation of the cable 3 during the production process and improving production efficiency; (3) automatic control and tension maintenance: this cable buffering device automatically controls and maintains cable tension to ensure product quality and consistency; (4) safe and convenient operation: this cable buffering device ensures safe and convenient operation, and operators can easily maintain and adjust it; and (5) real time feedback: the cable buffering device provides real-time feedback on storage capacity, allowing management to timely understand the production situation and make necessary adjustments. Consequently, in the aforementioned exemplary embodiments according to the present invention, the cable buffering device has a simple structure, a small volume, and is easy to control.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

The invention claimed is:

1. A cable buffering device, comprising:

a bracket;

a slide rail fixed on the bracket and extending in a vertical direction;

a slider slidably installed on the slide rail and moving along the slide rail;

an upper wheel rotatably mounted on the slider and rotating around a first horizontal axis;

a lower wheel located below the upper wheel and rotatably mounted on the bracket, the lower wheel rotates around a second horizontal axis parallel to the first horizontal axis; and a driver installed on the bracket and connected to the slider, the driver drives the slider and the upper wheel to move along the slide rail and adjusts a buffer amount of a cable wound on the upper wheel and the lower wheel, the driver applies a predetermined tension to the cable wound on the upper wheel and the lower wheel by driving the upper wheel to move along the slide rail.

2. The cable buffering device of claim 1, wherein an upper wheel shaft is fixed on the slider, and the upper wheel is rotatably mounted on the upper wheel shaft such that the upper wheel rotates around the first horizontal axis relative to the bracket and moves in the vertical direction relative to the bracket.

3. The cable buffering device of claim 1, wherein a lower wheel shaft is fixed on the bracket, and the lower wheel is rotatably installed on the lower wheel shaft such that the lower wheel rotates relative to the bracket about the second horizontal axis but cannot be moved in the vertical direction relative to the bracket.

4. The cable buffering device of claim 1, wherein the driver includes an electrical control cylinder installed on the bracket, an actuator of the electrical control cylinder is connected to the slider, the actuator drives the slider and the upper wheel to move in the vertical direction.

5. The cable buffering device of claim 1, further comprising a lower limit block fixed on the bracket, the lower limit block limits a lower limit position of the upper wheel, when the upper wheel is moved to the lower limit position, the lower limit block rests against the slider to restrict the upper wheel at the lower limit position.

6. The cable buffering device of claim 5, wherein the lower limit block is located above and adjacent to the lower wheel, the upper wheel is moved to the lower limit position under its own gravity and is supported at the lower limit position by the lower limit block during a maintenance period of the cable buffering device.

7. The cable buffering device according to claim 5, further comprising an upper limit block fixed on the bracket and limiting an upper limit position of the upper wheel, when the upper wheel is moved to the upper limit position, the upper limit block rests against the slider to limit the upper wheel at the upper limit position.

8. The cable buffering device of claim 1, further comprising a housing accommodating the bracket, the upper wheel, and the lower wheel, a cable input port and a cable output port are formed in the housing, the cable input port allows a cable input of the cable into the housing and the cable output port allows a cable output of the cable out of the housing.

9. The cable buffering device of claim 8, further comprising an input guide wheel and an output guide wheel, the input guide wheel is rotatably installed at the cable input port and guides the cable into the cable buffering device, the output guide wheel is rotatably installed at the cable output port and guides the cable to output from the cable buffering device.

10. The cable buffering device of claim 9, wherein the input guide wheel is higher than the output guide wheel, and the output guide wheel is higher than the lower wheel, the cable is guided to the lower wheel through the input guide wheel and wound on the lower wheel and the upper wheel, and the cable is guided from the lower wheel to an outside of the cable output port-via the output guide wheel.

11. The cable buffering device of claim 9, further comprising an input speed sensor and an output speed sensor, the input speed sensor is installed on the input guide wheel to detect an input speed of the cable input into the cable buffering device, the output speed sensor is installed on the output guide wheel to detect an output speed of the cable output from the cable buffering device.

12. The cable buffering device of claim 11, further comprising an upper wheel height controller adjusting a height of the upper wheel in real-time based on a difference between the input speed of the cable and the output speed of the cable such that the height of the upper wheel matches the difference between the input speed of the cable and the output speed of the cable.

13. The cable buffering device of claim 12, wherein when the input speed of the cable is greater than the output speed of the cable, the upper wheel height controller controls the driver to drive the upper wheel to move upward, so as to increase the height of the upper wheel and the buffer amount of the cable in the cable buffering device, when the input speed of the cable is less than the output speed of the cable, the upper wheel height controller controls the driver to drive the upper wheel to move downward, so as to reduce the height of the upper wheel and the buffer amount of the cable in the cable buffering device.

14. The cable buffering device of claim 12, further comprising an upper wheel height sensor and an upper wheel height calculator, the upper wheel height sensor is installed at the top of the bracket and faces the upper wheel and detects an actual height of the upper wheel, the upper wheel height calculator calculates an ideal height of the upper wheel based on the difference between the input speed of the cable and the output speed of the cable, the upper wheel height controller adjusts the height of the upper wheel in real time based on the difference between the actual height of the upper wheel and the ideal height of the upper wheel until the actual height of the upper wheel is equal to the ideal height of the upper wheel.

15. The cable buffering device of claim 8, wherein a cross-section of the housing is rectangular and tower shaped, and a height of the housing in the vertical direction is greater than a length of the housing and a width of the housing in a horizontal direction.

16. The cable buffering device of claim 8, wherein a cross-section of the bracket is rectangular and cylindrical, and a height of the bracket in the vertical direction is greater than a length of the bracket and a width of the bracket in a horizontal direction.

17. A cable supply system, comprising:

a cable supply device supplying a cable; and a cable buffering device including a bracket, a slide rail fixed on the bracket and extending in a vertical direction, a slider slidably installed on the slide rail and moving along the slide rail, an upper wheel rotatably mounted on the slider and rotating around a first horizontal axis, a lower wheel located below the upper wheel and rotatably mounted on the bracket, the lower wheel rotates around a second horizontal axis parallel to the first horizontal axis, and a driver installed on the bracket and connected to the slider, the driver drives the slider and the upper wheel to move along the slide rail and adjusts a buffer amount of a cable wound on the upper wheel and the lower wheel, the driver applies a predetermined tension to the cable wound on the upper wheel and the lower wheel by driving the upper wheel to move along the slide rail, the cable buffering device buffers the cable supplied from the cable supply device.

* * * * *